United States Patent Office 2,746,974
Patented May 22, 1956

2,746,974
PROCESS FOR PRODUCING OCTACHLORO-
THIOLANE

Charles E. Inman, Roslyn, Pa., assignor to The Pennsylvania Salt Manufacturing Company, Philadelphia, Pa., a corporation of Pennsylvania No Drawing. Application February 19, 1953,
Serial No. 337,871

6 Claims. (Cl. 260—332.5)

This invention relates to the preparation of octachlorothiolane by a chlorination process using iodine in small amounts as a catalyst.

Processes for the production of octachlorothiolane (or octachlorotetrahydrothiophene), a substance having the formula

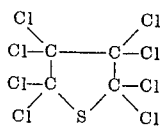

have been the subject of considerable experimentation—both catalytic and non catalytic.

In the absence of catalysts, exhaustive chlorination of thiophene has been found not to introduce chlorine beyond the hexachloro derivative (probably hexachlorothiolane or hexachlorothiolene or both). Actinic light was found to be of no aid in carrying the chlorination beyond this point. It has also been attempted to prepare octachlorothiolane by exhaustive chlorination in the presence of most of the usual chlorination catalysts. For example, ferric chloride, antimony trichloride, aluminum chloride, stannous chloride, bromine, phosphorus, and sulfur have been tried. In every case, nothing beyond the hexachloro derivative was obtained. The use of liquid chlorine, similarly, was found not to bring the chlorination beyond the point of the hexachloro derivative.

Of the catalytic processes, Coonradt et al., U. S. 2,504,068, chlorinates thiophene to produce octachlorothiolane employing 1 to 2 gram atoms of iodine per mol of thiophene. Similarly, Willgerodt, J. Prakt. Chem. 33, pages 150–151, teaches a process for making octachlorothiolane by the chlorination of iodothiophene. Thus, in both cases, at least 1 gram atom of iodine per mol thiophene is employed either as elemental iodine or as combined iodine in readily liberated form (i. e., by displacement from the iodothiophene). Coonradt et al., in their patent, state in fact that it is essential that at least 1 gram atom of iodine or equivalent amount of iodine chloride be used per mol of thiophene. Hartough ("Thiophene and Its Derivatives" published 1952 by Inter-Science Publishers, New York), referring to unpublished work of Coonradt, Hartough, and Norris, states that "continued chlorination gives no octachlorothiolane and at least 0.5 gram atom of iodine is required before this latter product can be detected in the reaction mixture." Hartough, as well as Norris et al., in their U. S. Patent 2,504,083, state that when employing iodine in an amount below 0.5 gram atom per mol thiophene, the most highly chlorinated material it is possible to get is hexachlorothiolene.

I have now discovered that under appropriate conditions 0.25 gram atom or less of iodine as catalyst is effective in the chlorination of thiophene or the lower chloro substituted derivatives of thiophene to yield substantial quantities of octachlorothiolane. As little as 0.004 gram atom of iodine per mol of thiophene will give an appreciable conversion of thiophene to octachlorothiolane. Starting with about 0.015 gram atom of iodine per mol of thiophene the conversion to octachlorothiolane is about 10% of theory, while starting with about 0.04 gram atom of iodine per mol of thiophene the conversion to octachlorothiolane is about 40%. With 0.2 gram atom of iodine per mol of thiophene the conversion to octachlorothiolane is well over 60% of theory. By a catalytic amount of iodine is meant that the quantity of iodine employed to catalyze the chlorination of thiophene is in the order of magnitude of the above described amount and represents a range preferably of 0.01 to 0.25 gram atom of iodine per mol of thiophene or chloro derivatives of thiophene. Iodine as used throughout the specifications and claims is intended to mean elemental iodine or an iodine compound which, under reaction conditions, liberates elemental iodine. The saving in iodine as compared to Coonradt et al. and to Willgerodt is clearly a worthwhile advantage.

In the operation of my process it is important that conditions be selected to insure complete addition chlorination and substitution chlorination of a substantial number of the thiophene nuclei in order to obtain worthwhile yields of octachlorothiolane. This is to be distinguished from the Norris et al. use of the term "complete chlorination" to mean only complete substitution chlorination, which was assumed to have been accomplished when the heat of reaction was no longer adequate to maintain the reaction mixture at an elevated temperature. Generally, sufficiently complete addition chlorination and substitution chlorination to give a worthwhile yield of octachlorothiolane in my process will have taken place when no appreciable increase in weight of the reaction mass occurs over a two-hour interval, while chlorinating at a temperature of 40 to 180° C. In a batch operation this will generally require over eight hours of chlorination.

In a preferred method of practicing the process of my invention, a small amount of iodine is added to thiophene or one of the mono-, di-, tri- or tetrachlorothiophenes, or any of the other chloro derivatives of thiophene below the octa-, from mono- to hexachlorothiolane or thiolene, or a mixture of two or more of these, and preferably a diluent such as chloroform is also added. The mixture is placed in a vessel equipped with reflux condenser and gaseous chlorine is introduced. The temperature during chlorination is maintained in the range of 40 to 180° C. Chlorination is continued at least until there is no appreciable gain in weight of the reaction mixtures as observed by weighing at two hour intervals. Chlorination may be continued far beyond this point, if desired, giving an increased yield of octachlorothiolane.

The resulting oil is washed with dilute alkali and with water, dried, and the diluent, if any, removed, e. g., by distillation. The residue oil is subjected to vacuum distillation to remove all products of less chlorine content than the octachlorothiolane. The vacuum distillation residue is recrystallized, e. g., from methanol solutions, to obtain a refined white crystalline product of melting point of 218 to 219° C. Thiophene or lower chloro derivatives thereof are the preferred starting materials.

While an inert diluent such as chloroform is useful in practicing my invention it can be omitted without difficulty. Carbon tetrachloride, other polychlorohydrocarbons, chlorofluorhydrocarbons, or other highly halogenated liquids, stable against heat and against attack by chlorine, can also be used in my process.

Octachlorothiolane, as above indicated, is a white crystaline solid melting at 218 to 219° C. and is completely stable at temperatures up to its melting point. It is insoluble in water but soluble in most organic solvents. Octachlorothiolane is important in the control of certain mites and is also useful as a chemical intermediate.

The following examples are illustrative of the process of my invention:

Example 1

Into 332 parts by weight dichlorothiophene, 513 parts by weight of chloroform (as diluent) and 5 parts by weight iodine contained in a vessel, gaseous chlorine was introduced. The rate of introduction was such as to maintain the temperature of the chlorination batch below 50° C. The degree of chlorination was determined from time to time by weighing the vessel and its contents. After approximately 16 hours of chlorination no further gain in weight was noted. The chlorination was discontinued at this point and the resulting oil was washed with dilute caustic solution and then with water and dried over $CaCl_2$. The $CHCl_3$ solvent was removed by distillation. The residue oils were subjected to vacuum distillation and a by-product hexachloro derivative of thiophene removed. The crude octachlorothiolane remained as residue from the distillation. The yield of the octachlorothiolane was 73 parts by weight, corresponding to 9% yield based on the starting dichlorothiophene. After two recrystallizations from methanol solutions, the melting point of the white crystalline product was 218–219° C.

Example 2

611 parts by weight thiophene in presence of 610 parts by weight $CCl_4$ and 40 parts by weight iodine was exhaustively chlorinated and purified as above. The yield of octachlorothiolane was 677 parts by weight, corresponding to 39% theoretical.

Example 3

200 parts by weight of a mixed hexachloro derivative of thiophene in presence of 633 parts by weight $CCl_4$ and 10 parts by weight iodine was exhaustively chlorinated and purified as above. The yield of octachlorothiolane was 30 parts by weight, corresponding to 12.1% theoretical.

Example 4

10 grams of iodine were added to 126 grams of anhydrous thiophene and chlorine gas was bubbled through while externally cooling to maintain a reaction temperature of 16 to 42° C. After the exothermic reaction subsided, heat was applied to maintain a reaction temperature of 50 to 80° C. and chlorination continued for a number of days after which large masses of crystals appeared. The temperature was then maintained at 125 to 160° C. for a further period of chlorination. A total of 37½ grams of iodine were added in three portions during chlorination.

The product, a mixture of brown crystals and brown liquid, was dissolved in carbon tetrachloride, washed with dilute caustic and then with water and then dried. The solvent was removed by distillation at slightly reduced pressure and the hexachlorothiolene was removed as a distillate at low pressure. The hexachlorothiolene weighed 63 g. The still pot residue, a solid mass of crude octachlorothiolane weighed 370.2 g. This is a 68% yield.

Since many modifications are possible in the process of my invention as above described without departing from the scope of the invention, it is intended that the above description should be interpreted as illustrative and the invention is not to be limited thereby.

This application is a continuation-in-part of my co-pending application Serial No. 143,353, filed February 9, 1950, now abandoned.

I claim:

1. A process for preparing octachlorothiolane which comprises introducing elemental chlorine into a material selected from the group consisting of thiophene and chloro derivatives of thiophene containing less than 8 atoms of chlorine in the molecule and otherwise unsubstituted, at a temperature of 40 to 180° C., and in the presence of up to 0.25 gram atom of iodine per mol of said material, and continuing the introduction of chlorine at least until, over a 2 hour period, no appreciable increase in weight due to chlorine substitution and addition takes place.

2. A process for preparing octachlorothiolane which comprises introducing elemental chlorine into the thiophene at a temperature of 40 to 180° C., and in the presence of 0.01 to 0.25 gram atom of iodine per mol of thiophene, and continuing the introduction of chlorine at least until, over a 2 hour period, no appreciable increase in weight due to chlorine substitution and addition takes place.

3. A process for preparing octachlorothiolane which comprises introducing elemental chlorine into a chlorothiophene otherwise unsubstituted, at a temperature of 40 to 180° C., and in the presence of 0.01 to 0.25 gram atom of iodine per mol of said chlorothiophene, and continuing the introduction of chlorine at least until, over a 2 hour period, no appreciable increase in weight due to chlorine substitution and addition takes place.

4. A process for preparing octachlorothiolane which comprises introducing elemental chlorine into a hexachloro derivative of thiophene otherwise unsubstituted, at a temperature of 40 to 180° C., and in the presence of 0.01 to 0.25 gram atom of iodine per mol of said thiophene derivative, and continuing the introduction of chlorine at least until, over a 2 hour period, no appreciable increase in weight due to chlorine substitution and addition takes place.

5. A process for preparing substantially pure octachlorothiolane which comprises introducing elemental chlorine into a material selected from the group consisting of thiophene and chloro derivatives of thiophene containing less than 8 atoms of chlorine in the molecule and otherwise unsubstituted, at a temperature of 40 to 180° C., and in the presence of 0.01 to 0.25 gram atom of iodine per mol of said material, and continuing the introduction of chlorine at least until, over a 2 hour period, no appreciable increase in weight due to chlorine substitution and addition takes place, and removing from the reaction mixture material containing less than 8 atoms of chlorine per molecule and subjecting the remainder to crystallization to obtain octachlorothiolane.

6. A process for preparing substantially pure octachlorothiolane which comprises introducing elemental chlorine into material selected from the group consisting of thiophene and chloro derivatives of thiophene containing not more than 4 atoms of chlorine in the molecule and otherwise unsubstituted, at a temperature of 40 to 180° C., and in the presence of 0.01 to 0.25 gram atom of iodine per mol of said material, and continuing the introduction of chlorine at least until, over a 2 hour period, no appreciable increase in weight due to chlorine substitution and addition takes place, removing from the reaction mixture material containing less than 8 atoms of chlorine per molecule, and subjecting the remainder to crystallization to obtain octachlorothiolane.

References Cited in the file of this patent

UNITED STATES PATENTS

| | | |
|---|---|---|
| 2,504,068 | Coonradt et al. | Apr. 11, 1950 |
| 2,504,084 | Norris et al. | Apr. 11, 1950 |